United States Patent
Matsusue et al.

(10) Patent No.: US 9,269,974 B2
(45) Date of Patent: Feb. 23, 2016

(54) FUEL CELL SYSTEM

(75) Inventors: Masaaki Matsusue, Mishima-shi (JP); Yutaka Tano, Toyota (JP); Naohisa Tsuchiya, Nagoya (JP); Tadaomi Kinomoto, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 1004 days.

(21) Appl. No.: 13/497,908

(22) PCT Filed: Sep. 25, 2009

(86) PCT No.: PCT/JP2009/066637
§ 371 (c)(1),
(2), (4) Date: Apr. 4, 2012

(87) PCT Pub. No.: WO2011/036765
PCT Pub. Date: Mar. 31, 2011

(65) Prior Publication Data
US 2012/0183873 A1    Jul. 19, 2012

(51) Int. Cl.
*H01M 8/04* (2006.01)

(52) U.S. Cl.
CPC ...... *H01M 8/04649* (2013.01); *H01M 8/04059* (2013.01); *H01M 8/04365* (2013.01); *H01M 8/04559* (2013.01); *H01M 8/04589* (2013.01); *Y02E 60/50* (2013.01)

(58) Field of Classification Search
CPC .............. H01M 8/04; H01M 8/04298; H01M 8/04313; H01M 8/04537; H01M 8/04649; H01M 8/04365; H01M 8/04559; H01M 8/04589; H01M 8/04059; Y02E 60/50
See application file for complete search history.

(56) References Cited

U.S. PATENT DOCUMENTS

| 6,841,275 | B2* | 1/2005 | Pearson | 429/9 |
| 8,900,768 | B2* | 12/2014 | Noto | H01M 8/04223 429/430 |
| 2004/0214061 | A1* | 10/2004 | Sugiura et al. | 429/23 |
| 2007/0259256 | A1* | 11/2007 | Le Canut et al. | 429/90 |
| 2008/0091629 | A1* | 4/2008 | Matsumoto | H01M 8/04223 706/14 |
| 2009/0029197 | A1* | 1/2009 | Hibino et al. | 429/13 |
| 2009/0117450 | A1* | 5/2009 | Iisaka | 429/42 |

FOREIGN PATENT DOCUMENTS

| JP | 2004-207029 A | 7/2004 |
| JP | 2005-071626 A | 3/2005 |
| JP | 2006-147404 A | 6/2006 |
| JP | 2006-309979 A | 11/2006 |
| JP | 2007-059319 A | 3/2007 |

(Continued)

OTHER PUBLICATIONS

International Search Report mailed Oct. 27, 2009 of PCT/JP2009/066637.

*Primary Examiner* — Ula C Ruddock
*Assistant Examiner* — Amanda Barrow
(74) *Attorney, Agent, or Firm* — Kenyon & Kenyon LLP

(57) ABSTRACT

A fuel cell system acquires an operation state of a fuel cell and estimates an IV characteristic that indicates a relationship between a current and a voltage in the fuel cell. At least one of a resistance overvoltage, an activation overvoltage, a current-voltage hysteresis and a concentration overvoltage of the fuel cell is determined from the operation state of the fuel cell, and the IV characteristic is estimated based on the determined result.

2 Claims, 4 Drawing Sheets

(56) References Cited

FOREIGN PATENT DOCUMENTS

| | | | |
|---|---|---|---|
| JP | 2007-157554 A | 6/2007 | |
| JP | 2008-218097 A | 9/2008 | |
| JP | 2008-269920 A | 11/2008 | |
| JP | 2008-300299 A | 12/2008 | |
| JP | 2009-026567 A | 2/2009 | |
| JP | 2009-070574 A | 4/2009 | |
| JP | 2009-117074 A | 5/2009 | |
| JP | 2009-158255 A | 7/2009 | |
| JP | 2009-199889 A | 9/2009 | |
| KR | 10-2009-0096649 | * 9/2009 | H01M 8/04 |
| WO | 2008/108451 A1 | 9/2008 | |
| WO | WO 2008/108451 | * 9/2008 | H01M 8/04 |
| WO | WO 2008/152950 | * 12/2008 | H01M 8/04 |

* cited by examiner

FUEL CELL SYSTEM

This is a 371 national phase application of PCT/JP2009/066637 filed 25 Sep. 2009, the contents of which are incorporated herein by reference.

TECHNICAL FIELD

The present invention relates to a fuel cell system that supplies a fuel gas including hydrogen and an oxidant gas to a fuel cell to generate electrical power.

BACKGROUND ART

A polymer electrolyte fuel cell, for example, is known as one type of fuel cell which generates electrical power utilizing an electrochemical reaction between hydrogen and oxygen. The polymer electrolyte fuel cell includes a stack which is constituted of a plurality of stacked cells. The cells constituting the stack each include an anode (fuel electrode) and a cathode (air electrode), and a solid polymer electrolyte membrane having a sulfonic acid group as an ion exchange group is interposed between each anode and cathode.

A fuel gas (hydrogen-enriched reformed hydrogen obtained by reforming hydrogen gas or hydrocarbon) is supplied to the anode, while an oxidant gas containing oxygen (for example, air) is supplied to the cathode as an oxidant. Upon the supply of the fuel gas to the anode, hydrogen contained in the fuel gas reacts with a catalyst in a catalyst layer which constitutes the anode, thereby producing hydrogen ions. The hydrogen ions produced thereby pass through the solid polymer electrolyte membrane and electrically react with oxygen in the cathode. Electrical power is thus generated through the electrochemical reaction.

As an example of such a fuel cell system, the invention disclosed in patent document 1 described below is suggested. The fuel cell system disclosed in patent document 1 described below suppresses a variation in the cell voltage of the fuel cell body while eliminating the waste of source gas and raw material supply power. Specifically, when a variation occurs in the voltage of a power-generating cell that constitutes the fuel cell body, a determination is made as to whether or not the cause is due to a source gas distribution inside the fuel cell body or a cell degradation, and a source gas stoichiometry ratio is set in accordance with the determined result.

As an example of such a fuel cell system, the invention disclosed in patent document 2 described below is suggested. The fuel cell system disclosed in patent document 2 described below does not prompt a user to inspect or exchange when there is a recoverable decrease in the current-voltage characteristic of a fuel cell, but is capable of prompting the user to inspect or exchange when the non-recoverable amount of decrease in the current-voltage characteristic of the fuel cell reaches a predetermined value. This fuel cell system estimates the current-voltage characteristic of the fuel cell body to judge the degradation of the fuel cell body. Specifically, the amount of decrease in the current-voltage characteristic from the pre-stored initial value V1 of the current-voltage characteristic to the present voltage value V3 is referred to as a first decreased amount, and the recoverable amount of decrease in the current-voltage characteristic when the operation is stopped is referred to as a second decreased amount. A third decreased amount obtained by subtracting the second decreased amount from the first decreased amount is a non-recoverable amount of decrease, and when the third decreased amount reaches the predetermined value, the user is prompted to inspect or exchange the fuel cell body.

As an example of such a fuel cell system, the invention disclosed in patent document 3 described below is suggested. The fuel cell system disclosed in patent document 3 described below stably extracts output without causing a hunting of an output limitation. Specifically, when an output voltage of the fuel cell falls below a voltage lower limit threshold value at which the fuel cell is capable of stably generating power, the current to be extracted from the fuel cell is limited, and when the output voltage rises and reaches the voltage lower limit threshold or higher, the limitation for the current to be extracted from the fuel cell is released, and further, the upper limit for the amount of increase in the current when the limitation for the current is released is computed.

PRIOR ART REFERENCES

Patent Document

Patent Document 1: Japanese laid-open patent publication No. 2004-207029
Patent Document 2: Japanese laid-open patent publication No. 2006-147404
Patent Document 3: Japanese laid-open patent publication No. 2006-309979

SUMMARY OF THE INVENTION

Problem to be Solved by the Invention

In a fuel cell system that supplies a fuel gas including hydrogen and an oxidant gas to a fuel cell to generate electrical power, since the relationship between the current and the voltage of the fuel cell varies, it is required that the relationship between the current and the voltage be known through accurate estimation. As a method of estimating the relationship between the current and the voltage (IV estimation), there is a learning mode IV estimation method that follows an actual measurement value from a pre-set IV estimation map. In this method, the operation control of the fuel cell system may not approach such following, thereby causing a power distribution failure or battery overcharge. In order to avoid such a problem, shortening the following interval may be considered, but in such a case, the power distribution may be fluctuating, thereby causing a surge. On the other hand, a method of absorbing the part in which the power distribution is fluctuating in a capacitor component of a fuel cell may be considered. However, in this case, the degradation of a Pt catalyst of the fuel cell is an issue for concern.

The present invention has been made in light of such problems, and its object is to provide a fuel cell system that is capable of accurately performing an IV estimation of a fuel cell based on rules and principles.

Means for Solving the Problem

In order to solve the problems described above, the fuel cell system according to the present invention supplies a fuel gas including hydrogen and an oxidant gas to a fuel cell to generate electrical power. The fuel cell system comprises operation state acquisition means for acquiring an operation state of the fuel cell and characteristic estimation means for estimating an IV characteristic that indicates a relationship between a current and a voltage in the fuel cell. The characteristic estimation means determines at least one of a resistance overvoltage, an activation overvoltage, a current-voltage hysteresis and a concentration overvoltage of the fuel cell from the operation state acquired by the operation state acquisition means and estimates the IV characteristic based on the determined result.

According to the present invention, the operation state acquisition means acquires the operation state of the fuel cell and, based on the acquired operation state, the characteristic estimation means determines at least one of the resistance overvoltage, the activation overvoltage, the current-voltage hysteresis and the concentration overvoltage of the fuel cell. Thus, at least one of the resistance overvoltage, the activation overvoltage, the current-voltage hysteresis and the concentration overvoltage of the fuel cell can be accurately ascertained based on the operation state of the fuel cell. Furthermore, since the characteristic estimation means estimates the IV characteristic based on at least one of the resistance overvoltage, the activation overvoltage, the current-voltage hysteresis and the concentration overvoltage of the fuel cell, an IV estimation of the fuel cell based on, for example, the rules and principles of a Butler-Volmer equation, can be performed.

In the fuel cell system according to the present invention, it is preferable that the operation state acquisition means measures an impedance at a stable state of the fuel cell, and the characteristic estimation means determines the resistance overvoltage based on an impedance measurement value and estimates the IV characteristic based on the determined resistance overvoltage. In this preferred mode, the impedance at a stable state of the fuel cell is measured so as to determine the resistance overvoltage, and thus an accurate resistance overvoltage, that is based on the internal state of the fuel cell, can be determined. Since the IV characteristic is estimated based on the resistance overvoltage that was determined as described above, this enables an IV estimation that accurately reflects the internal state of the fuel cell based on rules and principles.

The fuel cell system according to the present invention comprises degradation detection means for detecting a degradation of the fuel cell, and control means for performing an operation control of the fuel cell system. It is preferable that the degradation detection means ascertains whether or not there is membrane thinning of a unit cell that constitutes the fuel cell, based on the impedance of the fuel cell measured by the operation state acquisition means, and the control means performs a flooding prevention control and a warning alarm control when the membrane thinning occurs. In this preferred mode, the membrane resistance of the fuel cell can be determined based on the impedance of the fuel cell, and the membrane thickness can be ascertained from the membrane resistance and from proton conductivity. Accordingly, whether or not there is membrane thinning of a unit cell that constitutes the fuel cell can be ascertained, and the flooding prevention control and the warning alarm control that correspond to the membrane thinning can be performed.

In the fuel cell system according to the present invention, it is preferable that the operation state acquisition means measures an output current, an exchange current density and a temperature of the fuel cell, and the characteristic estimation means determines the activation overvoltage based on the output current, the exchange current density and the temperature and estimates the IV characteristic based on the determined activation overvoltage. In this preferred mode, since the activation overvoltage is determined based on the output current, the exchange current density and the temperature, an accurate activation overvoltage based on the internal state of the fuel cell can be determined. Since the IV characteristic is estimated based on the activation overvoltage determined as described above, this enables an IV estimation that accurately reflects the internal state of the fuel cell based on rules and principles.

The fuel cell system according to the present invention comprises degradation detection means for detecting a degradation of the fuel cell and control means for performing an operation control of the fuel cell system. It is preferable that the degradation detection means estimates an effective surface area of a Pt catalyst used in the fuel cell, and that the control means performs a degradation suppression operation of the Pt catalyst based on the estimated effective surface area of the Pt catalyst. A variation in the exchange current density can be ascertained by the activation overvoltage determined by the operation state acquisition means and the actually measured output voltage. In this preferred mode, the effective surface area of the Pt catalyst is estimated, taking into consideration that the variation in the exchange current density depends on the variation in the effective surface area of the Pt catalyst. Since the degradation suppression operation of the Pt catalyst is performed based on the effective surface area of the Pt catalyst estimated as described above, this enables a degradation suppression control that accurately reflects the internal state of the fuel cell.

In the fuel cell system according to the present invention, it is preferable that the operation state acquisition means acquires a relationship between an oxidation-reduction reaction rate of the Pt catalyst used in the fuel cell and an output voltage and temperature of the fuel cell, and the characteristic estimation means determines the current-voltage hysteresis based on the acquired relationship between the oxidation-reduction reaction rate of the Pt catalyst and the output voltage and temperature of the fuel cell and estimates the IV characteristic based on the determined current-voltage hysteresis. In this preferred mode, based on the fact that the oxide film of the Pt catalyst affects the current-voltage hysteresis, a Pt/PtO in the Pt catalyst is calculated from the relationship between the oxidation-reduction reaction rate of the Pt catalyst and the output voltage and temperature of the fuel cell so as to determine the current-voltage hysteresis. Since the IV characteristic is estimated based on the current-voltage hysteresis determined as described above, this enables an IV estimation that accurately reflects the internal state of the fuel cell based on rules and principles.

In the fuel cell system according to the present invention, it is preferable that the characteristic estimation means estimates a degree of elution of the Pt catalyst based on the relationship between the oxidation-reduction reaction rate of the Pt catalyst and the output voltage and temperature of the fuel cell acquired by the operation state acquisition means, and the control means performs a degradation suppression operation of the Pt catalyst based on the estimated degree of elution of the Pt catalyst. In this preferred mode, since the degree of elution of the Pt catalyst is estimated based on the relationship between the oxidation-reduction reaction rate of the Pt catalyst and the output voltage and temperature of the fuel cell, this enables the degradation suppression operation of the Pt catalyst to be performed based on the accurately ascertained degree of degradation of the Pt catalyst, thereby enabling a degradation suppression control that accurately reflects the internal state of the fuel cell.

In the fuel cell system according to the present invention, it is preferable that the operation state acquisition means acquires a temperature, a stoichiometry ratio and an amount of residual water of the fuel cell, and the characteristic estimation means determines the concentration overvoltage based on the acquired temperature, stoichiometry ratio and amount of residual water of the fuel cell and estimates the IV characteristic based on the determined concentration overvoltage. In this preferred mode, the concentration overvoltage is determined based on the temperature, stoichiometry ratio and amount of residual water of the fuel cell, thereby being able to determine an accurate concentration overvoltage that is based on the internal state of the fuel cell. Since the IV characteristic is estimated based on the concentration overvoltage determined as described above, this enables an IV estimation that accurately reflects the internal state of the fuel cell based on rules and principles.

In the fuel cell system according to the present invention, it is preferable that the operation state acquisition means estimates an amount of residual water from the output current of the fuel cell, and the characteristic estimation means determines the concentration overvoltage based on the acquired amount of residual water and estimates the IV characteristic based on the determined concentration overvoltage. In this preferred mode, since the amount of residual water is estimated from the output current and then based on this estimated amount of residual water the concentration overvoltage is determined so as to estimate the IV characteristic, this enables an IV estimation that accurately reflects the internal state of the fuel cell.

The fuel cell system according to the present invention comprises degradation detection means for detecting a degradation of the fuel cell and control means for performing an operation control of the fuel cell system. It is preferable that the degradation detection means estimates a degree of carbon oxidation of the Pt catalyst used in the fuel cell, and the control means performs a warning control based on the estimated degree of carbon oxidation of the Pt catalyst. In this preferred embodiment, since the degree of carbon oxidation of the Pt catalyst is estimated from the degree of decrease in the IV characteristic due to the concentration overvoltage, this enables an estimation that accurately reflects the internal state of the fuel cell, thereby enabling an accurate warning control to be performed.

Effect of the Invention

According to the present invention, a fuel cell system that is capable of accurately performing an IV estimation of a fuel cell based on rules and principles, is provided.

MODE FOR CARRYING OUT THE INVENTION

Figure 1:
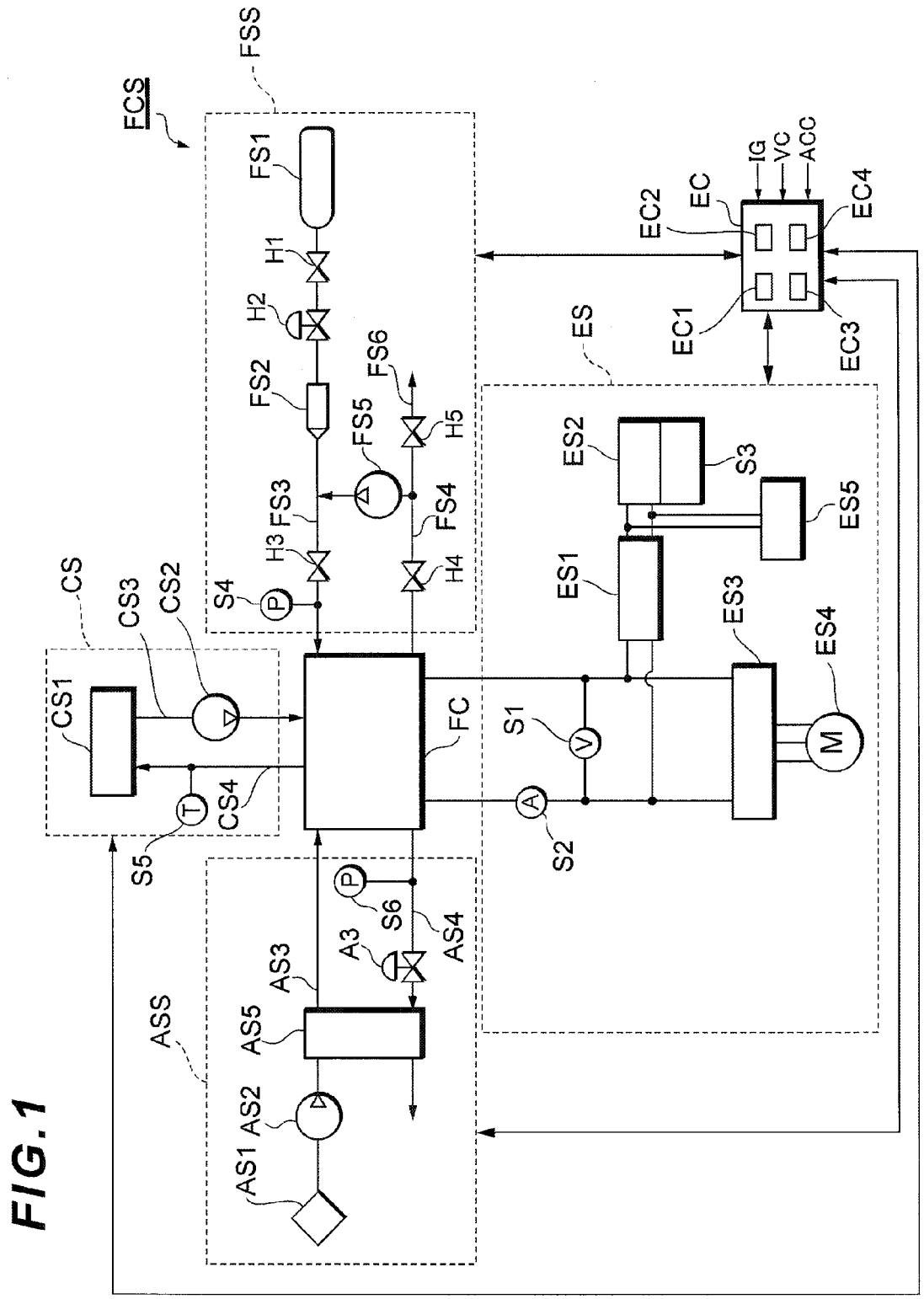
FIG. 1 is a diagram showing a configuration of a fuel cell system installed in a fuel cell hybrid vehicle which is an embodiment of the present invention.

An embodiment of the present invention will be described below with reference to the attached drawings. In order to easily understand the descriptions, corresponding reference numerals are assigned to corresponding components wherever possible in each drawing and redundant descriptions will be omitted.

Firstly, a fuel cell system FCS mounted in a fuel cell vehicle which is the embodiment of the present invention will be described with reference to FIG. 1. FIG. 1 is a diagram showing a system configuration of a fuel cell system FCS which serves as an on-vehicle power source system of a fuel cell vehicle. The fuel cell system FCS can be mounted in vehicles such as fuel cell hybrid vehicles (FCHV), electric vehicles and hybrid vehicles.

The fuel cell system FCS comprises a fuel cell FC, an oxidant gas supply system ASS, a fuel gas supply system FSS, an electrical system ES, a cooling system CS and a controller EC. The fuel cell FC is supplied with a reactant gas (fuel gas, oxidant gas) to generate power. The oxidant gas supply system ASS is a system for supplying air as an oxidant gas to the fuel cell FC. The fuel gas supply system FSS is a system for supplying hydrogen gas as a fuel gas to the fuel cell FC. The electrical power system ES is a system for controlling charge/discharge of the power. The cooling system CS is a system for cooling the fuel cell FC. The controller EC is a controller that centrally controls the entire fuel cell system FCS.

The fuel cell FC is configured as a solid polymer electrolyte cell stack in which a plurality of cells (a single battery comprising an anode, cathode and electrolyte (generator)) is stacked in series. A temperature sensor that is not shown in the drawing is provided in the fuel cell FC. In the fuel cell FC, in normal operation, an oxidization reaction represented as the below formula (1) occurs at the anode, and a reduction reaction represented as the below formula (2) occurs at the cathode. An electrogenic/electromotive reaction represented as the below formula (3) occurs in the entire fuel FC.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

The oxidant gas supply system ASS includes an oxidant gas flow path AS3 and an oxidant off-gas flow path AS4. The oxidant gas flow path AS3 is a flow path in which the oxidant gas supplied to the cathode of the fuel cell FC flows. The oxidant off-gas flow path AS4 is a flow path in which the oxidant off-gas exhausted from the fuel cell FC flows.

The oxidant gas flow path AS3 is provided with an air compressor AS2 and a humidifier AS5. The air compressor AS2 is a compressor for introducing oxidant gas from the atmosphere through a filter AS1. The humidifier AS5 is a humidifier for humidifying the oxidant gas that is compressed by the air compressor AS2.

The oxidant off-gas flow path AS4 is provided with a pressure sensor S6, a backpressure regulating valve A3 and a humidifier AS5. The backpressure regulating valve A3 is a valve for regulating the supply pressure of the oxidant gas. The humidifier AS5 is provided for exchanging water between the oxidant gas (dry gas) and the oxidant-off gas (wet gas).

The fuel gas supply system FSS includes a fuel gas supply source FS1, a fuel gas flow path FS3, a circulation flow path FS4, a circulation pump FS5 and an exhaust/drain flow path FS6. The fuel gas flow path FS3 is a flow path for the fuel gas supplied from the fuel gas supply source FS1 to the anode of the fuel cell FC to flow. The circulation flow path F4 is a flow path for returning a fuel off-gas exhausted from the fuel cell FC to the fuel gas flow path FS3. The circulation pump FS5 is a pump for pumping the fuel off-gas in the circulation flow path FS4 to the fuel gas flow path FS3. The exhaust/drain flow path FS6 is a flow path that branches off from the circulation flow path FS4.

The fuel gas supply source FS1 is constituted from, for example, a high-pressure hydrogen tank and hydrogen-absorbing alloy, and the fuel gas supply source FS1 being configured to store hydrogen gas at high-pressure (e.g., 35 MPa to 70 MPa) therein. When opening a cutoff valve H1, the fuel gas flows out from the fuel gas supply source FS1 into the fuel gas flow path FS3. The fuel gas is decompressed to, for example, about 200 kPa by a regulator H2 and injector FS2, and supplied to the fuel cell FC.

The fuel gas flow path FS3 is provided with a cutoff valve H1, a regulator H2, an injector FS2, a cutoff valve H3 and a pressure sensor S4. The cutoff valve H1 is a valve for shutting off or allowing the supply of fuel gas from the fuel gas supply source FS1. The regulator H2 regulates the pressure of the fuel gas. The injector FS2 controls the amount of supply of the fuel gas to the fuel cell FC. The cutoff valve H3 is a valve for shutting off the supply of the fuel gas to the fuel cell FC.

The regulator H2 is a device for regulating the pressure at its upstream side (primary pressure) to a preset secondary pressure, and it is constituted by, for example, a mechanical pressure-reducing valve which reduces the primary pressure. The mechanical pressure-reducing valve has a configuration in which: a casing having a backpressure chamber and a pressure regulating chamber separated by a diaphragm is provided; and, with the backpressure in the backpressure chamber, the primary pressure is reduced to a predetermined pressure in the pressure regulating chamber, thereby obtaining the secondary pressure. The regulator H2 is arranged upstream of the injector FS2, thereby the pressure at the upstream of the injector FS2 can be reduced effectively.

The injector FS2 is an electromagnetic drive-type on-off valve having a configuration in which a valve body is directly driven with an electromagnetic driving force with a predetermined drive period so as to be separated from a valve seat, thereby regulating the gas flow rate and gas pressure. The injector FS2 comprises a valve seat having an injection hole through which gas fuel such as a fuel gas is injected, a nozzle body for supplying and guiding the gas fuel to the injection hole; and a valve body which is held so as to be contained in a movable manner in an axial direction (gas flow direction) with respect to the nozzle body and which opens/closes the injection hole.

The valve body of the injector FS2 is driven by a solenoid, which is an electromagnetic device, and a gas injection period and a gas injection time of the injector FS2 can be controlled by control signals output from the controller EC. In the injector FS2, in order to supply gas at a flow rate required for the downstream, at least one of the opening area (degree of opening) and the open time of the valve body provided in a gas flow path of the injector FS2 is changed, thereby adjusting the flow rate (or hydrogen mol concentration) of the gas supplied to the downstream.

The circulation flow path FS4 is provided with a cutoff valve H4, and an exhaust/drain flow path FS6 is connected to the circulation flow path FS4. The exhaust/drain flow path FS6 is provided with an exhaust/drain valve H5. The exhaust/drain valve H5 is a valve for discharging the fuel off-gas containing impurities and moisture in the circulation flow path FS4 outside by operating In accordance with the commands from the controller EC. By opening the exhaust/drain valve H5, the concentration of the impurities contained in the fuel off-gas in the circulation flow path FS4 decreases, which enables the hydrogen concentration of the fuel off-gas circulating in a circulation system to increase.

The fuel off-gas discharged through the exhaust/drain valve H5 is mixed with the oxidant-off gas flowing in the oxidant-off gas flow path AS4, and the mixture is diluted with a diluter (not shown). The circulation pump FS5 circulates and supplies the fuel off-gas in the circulation system to the fuel cell FC by a motor drive.

The electrical power system ES includes a DC/DC converter ES1, a battery ES2, a traction inverter ES3, a traction motor ES4 and auxiliary devices ES5. The fuel cell system FCS is configured as a parallel hybrid system in which the DC/DC converter ES1 and the traction inverter ES3 are connected in parallel with the fuel cell FC.

The DC/DC converter ES1 has a function of increasing a direct-current voltage supplied from the battery ES2 and outputting the resultant direct-current voltage to the traction inverter ES3, and a function of decreasing the direct-current power generated by the fuel cell FC or the regenerative power collected by the traction motor ES4 via regenerative braking and charging the battery ES2 with the resultant power. These functions of the DC/DC converter ES1 control the charge and discharge of the battery ES2. The voltage conversion control by the DC/DC converter ES1 controls an operation point (output terminal voltage and output current) of the fuel cell FC. The fuel cell FC is provided with a voltage sensor S1 and a current sensor S2. The voltage sensor S1 is a sensor for detecting the output terminal voltage of the fuel cell FC. The current sensor S2 is a sensor for detecting the output current of the fuel cell FC.

The battery ES2 functions as a storage source of surplus power, a storage source of regenerative energy during regenerative braking, and an energy buffer during a load variation as a result of acceleration or deceleration of a fuel cell vehicle. The battery ES2 is preferably constituted by a secondary battery such as a nickel/cadmium storage battery, a nickel/hydrogen storage battery, or a lithium secondary battery. The battery ES2 is provided with an SOC sensor S3 for detecting the SOC (state of charge).

The traction inverter ES3 is, for example, a PWM inverter driven by a pulse width modulation method. In accordance with control commands from the controller EC, the traction inverter ES3 converts a direct-current voltage output from the fuel cell FC or the battery ES2 into a three-phase AC voltage, thereby controlling a rotation torque of the traction motor ES4. The traction motor ES4 is, for example, a three-phase AC motor, and constitutes a power source of the fuel cell vehicle.

The auxiliary device ES5 is a generic name for motors arranged in the respective units in the fuel cell system FCS (e.g., power sources for pumps, etc.), inverters for driving these motors, and various vehicle-mounted auxiliary devices (e.g., an air compressor, injector, cooling water circulation pump and radiator).

The cooling system CS includes a radiator CS1, a coolant pump CS2, a coolant forward path CS3 and a coolant return path CS4. The radiator CS1 discharges heat of the coolant for cooling the fuel cell FC to cool the fuel cell FC. The coolant pump CS2 is a pump for circulating the coolant between the fuel cell FC and the radiator CS1. The coolant forward path CS3 is a flow path that connects the radiator CS1 and the fuel cell FC, and the coolant forward path CS3 is provided with a coolant pump CS2. Driving the coolant pump CS2 allows the coolant to flow from the radiator CS1 to the fuel cell FC through the coolant forward path CS3. The coolant return path CS4 is a flow path that connects the fuel cell FC and the radiator CS1, and the coolant return path CS4 is provided with a water temperature sensor S5. Driving the coolant pump CS2 allows the coolant that cooled the fuel cell FC to flow back to the radiator CS1.

The controller EC (control unit) is a computer system which includes a CPU, ROM, RAM and an input/output interface, and controls the respective units of the fuel cell system FCS. For example, when an ignition signal IG output from an ignition switch is received, the controller EC starts the operation of the fuel cell system FCS. Subsequently, the controller EC obtains the request power of the entire fuel cell system FCS based on an acceleration-opening-degree signal ACC output from an acceleration sensor, a vehicle speed signal VC output from a vehicle speed sensor, etc. The request power of the entire fuel cell system FCS is a total value of vehicle driving power and the auxiliary-machine power.

The auxiliary-device power includes, e.g., power consumed by vehicle-mounted auxiliary devices (humidifier, air compressor, hydrogen pump, cooing water circulation pump, etc.), power consumed by devices necessary for vehicle driving (change gear, wheel control device, steering device, suspension device, etc.), and power consumed by devices arranged in an occupant space (air-conditioning device, illumination device, audio equipment, etc.).

The controller EC determines an output power distribution between the fuel cell FC and the battery ES2. In addition, the controller EC controls the oxidant gas supply system ASS and the fuel gas supply system FSS so that the amount of power generated by the fuel cell FC corresponds to the target power, and also controls the DC/DC converter ES1, thereby controlling the operation point (output terminal voltage and output current) of the fuel cell FC. Moreover, in order to obtain a target torque in accordance with an acceleration opening degree, the controller EC outputs, for example, respective AC voltage command values of a U-phase, a V-phase and a W-phase as switching commands to the traction inverter ES3, and controls the output torque and revolution speed of the traction motor ES4. Additionally, the controller EC controls the cooling system CS to control the fuel cell FC to be at a suitable temperature.

With the above configuration, the fuel cell system FCS of the present embodiment serves as a fuel cell system comprising: operation state acquisition means EC1 for acquiring an operation state of a fuel cell FC; characteristic estimation means EC2 for estimating an IV characteristic that indicates a relationship between a current and a voltage in the fuel cell FC; degradation detection means EC3 for detecting a degradation of the fuel cell FC; and control means EC4 for performing an operation control of the fuel cell system FCS. Accordingly, the controller EC serves as the operation state acquisition means EC1, the characteristic estimation means EC2, the degradation detection means EC3 and the control means EC4.

Figure 2:
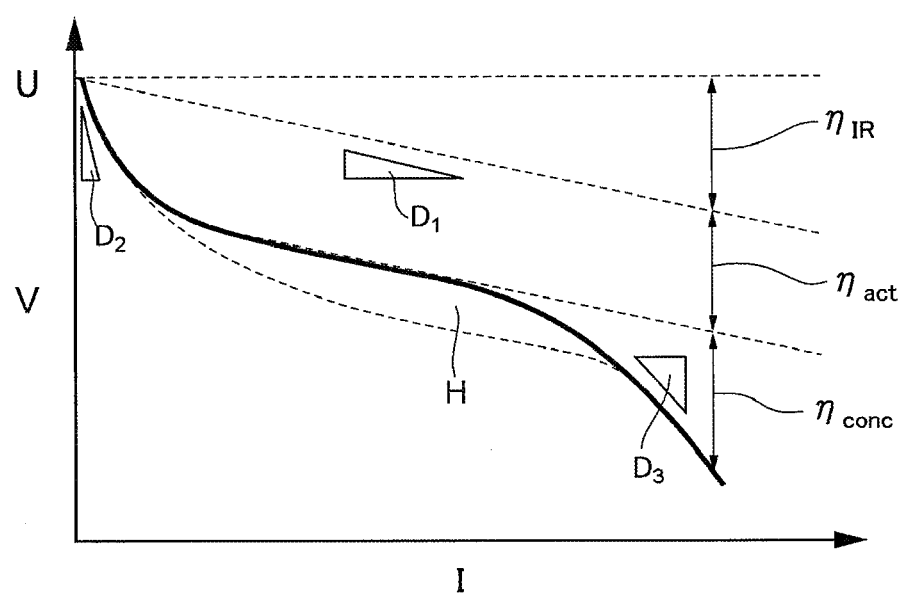
FIG. 2 is a diagram showing an example of an IV characteristic of a fuel cell of FIG. 1.

FIG. 2 is a diagram showing a current-voltage characteristic (IV characteristic) of the fuel cell FC used in the fuel cell system FCS. As shown in FIG. 2, the voltage V of the fuel cell FC is calculated by subtracting the resistance overvoltage $\eta_{IR}$, activation overvoltage $\eta_{act}$ and concentration overvoltage $\eta_{conc}$ from a constant U corresponding to the open circuit voltage.

$$V = U - \text{activation overvoltage } \eta_{act} - \text{concentration overvoltage } \eta_{conc} - \text{resistance overvoltage } \eta_{IR} \quad (4)$$

The characteristic estimation means EC2 determines at least one of the resistance overvoltage $\eta_{IR}$, activation overvoltage $\eta_{act}$, current-voltage hysteresis H and concentration overvoltage $\eta_{conc}$ of the fuel cell FC from the operation state acquired from the operation state acquisition means EC1, and then estimates the IV characteristic based on the determined result.

Firstly, a current-voltage estimation (IV estimation) by the resistance overvoltage $\eta_{IR}$ and a change in control will be described. The operation state acquisition means EC1 measures the impedance at a stable state of the fuel cell FC, and the characteristic estimation means EC2 determines the resistance overvoltage $\eta_{IR}$ based on the impedance measurement value and estimates the IV characteristic based on the determined resistance overvoltage $\eta_{IR}$. In other words, the resistance overvoltage $\eta_{IR}$ is determined by determining the inclination of $\Delta 1$ in FIG. 2 from the impedance measurement value.

The degradation detection means EC3 ascertains whether there is a membrane thinning of a unit cell that constitutes the fuel cell FC based on the impedance of the fuel cell FC measured by the operation state acquisition means, and the control means EC4 performs a flooding prevention control and a warning alarm control when a membrane thinning occurs. Specifically, a change in membrane thickness is ascertained based on a relational expression (5) of the membrane resistance $R_{mem}$, proton conductivity of a membrane $k_{mem}$, and membrane thickness $Z_{mem}$ to ascertain whether or not there is a membrane thinning.

$$R_{mem} = 1/k_{mem} \times Z_{mem} \quad (5)$$

Since the amount of water permeation and residual water change when the membrane thickness of the fuel cell FC changes, it is preferable to estimate them and perform a flooding prevention control or a warning alarm control. As a flooding prevention control, it is preferable to increase the stoichiometry or decrease the backpressure. When it is estimated that the membrane thickness is decreasing to an extreme extent, there may be a hole in the membrane, thereby causing an irreparable defect. Thus, it is preferable to warn the user so as to prompt a stack exchange of the fuel cell FC.

Next, a current-voltage estimation (IV estimation) by the activation overvoltage $\eta_{act}$ and a change in control will be described. The operation state acquisition means EC1 measures the output current, exchange current density and temperature of the fuel cell FC, and the characteristic estimation means EC2 determines the activation overvoltage $\eta_{act}$ based on a relational expression (6) of the output current i, exchange current density io and temperature T thereof and estimates the IV characteristic based on the determined activation overvoltage $\eta_{act}$. In other words, the inclination of $\Delta 2$ in FIG. 2 is determined.

$$\eta_{act} = RT/2\alpha F \times \ln(i/io) \quad (6)$$

In expression (6), R is a gas constant, F is a Faraday constant, and $\alpha$ is a charge transfer coefficient. The charge transfer coefficient $\alpha$ is a coefficient determined by a catalyst used in the fuel cell FC. A current $i_{cross}$ resulting from the taking into account of a fuel gas cross leak in the output current i may be added.

The degradation detection means EC3 estimates an effective surface area of a Pt catalyst used in the fuel cell FC, and the control means EC4 performs a degradation suppression operation of the Pt catalyst based on the estimated effective surface area of the Pt catalyst. Specifically, the change in the exchange current density io is estimated from the deviation of the actually measured output voltage and expression (6), and the effective surface area of the Pt catalyst is estimated considering that the exchange current density io is proportional to the effective surface area of the Pt catalyst. If the effective surface area of the Pt catalyst is equal to or less than the predetermined area, a degradation suppression operation will be performed. The degradation suppression operation performs an operation for decreasing the activation overvoltage and increasing the oxygen partial pressure at a low load. More specifically, it is preferable to perform an air stoichiometry or backpressure increase. When the effective surface area of the Pt catalyst is excessively decreased or the degradation is severe, it is preferable to warn the user so as to prompt a stack exchange of the fuel cell FC.

When the activation overvoltage $\eta_{act}$ is to be determined, during an operation in an operation range where the fuel cell FC is stable, it is preferable to acquire the actual measurement values of the output current and the output voltage of the fuel cell FC and then calculate the activation overvoltage $\eta_{act}$ based on the acquired current and voltage. Specifically, the activation overvoltage $\eta_{act}$ is determined by performing a linear approximation for the upper limit line that connects the maximum value of the voltage values at respective currents of the actual measurement data. In this case, it is preferable to use the actual measurement data of the middle load range in which the IV characteristic curve may be considered to be a schematic straight line. Since the decrease in surface area of the Pt catalyst proceeds extremely slowly, even if only such data regarding stable operation range is selected and used, the actual phenomenon can still be sufficiently followed.

Next, a current-voltage estimation (IV estimation) by the current-voltage hysteresis H and a change in control will be described. The operation state acquisition means EC1 acquires the relationship between the oxidation-reduction reaction rate of the Pt catalyst used in the fuel cell FC and the output voltage or temperature of the fuel cell FC. The characteristic estimation means EC2 determines the current-voltage hysteresis H based on the acquired relationship between the oxidation-reduction reaction rate of the Pt catalyst and the output voltage or temperature of the fuel cell FC, and then estimates the IV characteristic based on the determined current-voltage hysteresis H.

Figure 3:
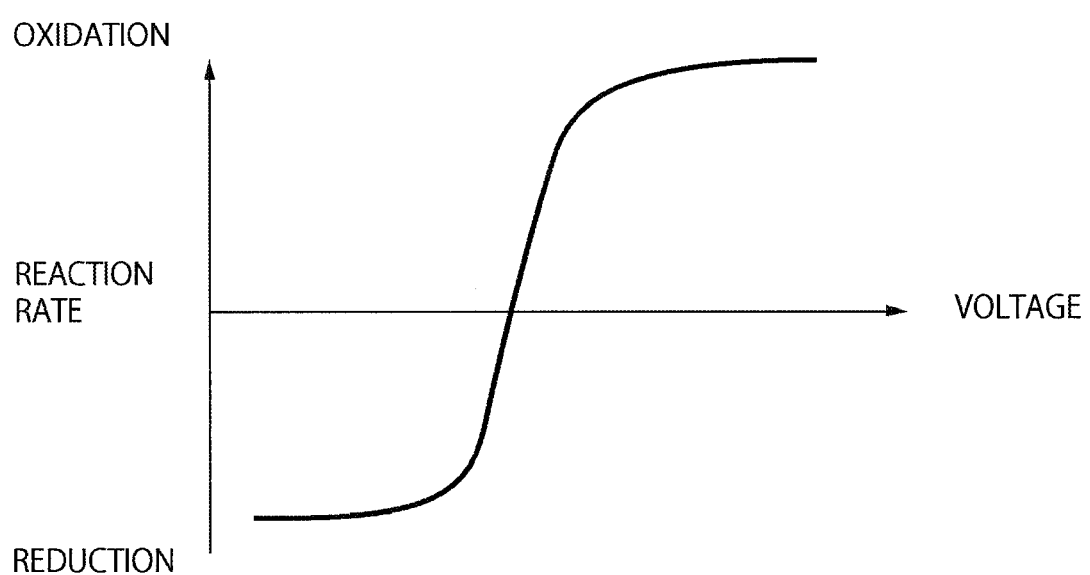
FIG. 3 is a diagram showing a relationship between a voltage and a reaction rate which is used when the IV characteristic is estimated.

An example of the relationship between the oxidation-reduction reaction rate of the Pt catalyst and the output voltage of the fuel cell FC is shown in FIG. 3. As shown in FIG. 3, the oxidation-reduction reaction rate of the Pt catalyst is determined from the prior evaluation, and the map for the output voltage is previously set. Then, by integration, the Pt/PtO ratio can be calculated, thereby being able to calculate the effective surface area of the Pt catalyst. The current-voltage hysteresis H which is the amount of fall due to the PtO of the IV characteristic is determined by a relational expression (7).

$$H = RT/F \times In(a \times i_{orr} \times L) \quad (7)$$

In expression (7), R is a gas constant, F is a Faraday constant, T is a temperature of the fuel cell FC, a is a PT surface area, $i_{orr}$ is an oxygen reduction current density, and L is a cathode catalyst layer thickness. The oxygen reduction current density $i_{orr}$ is determined by the current density io. In this case, it is preferable that the refresh operation is performed and that such state has a basis of Pt being 100% and PtO being 0%.

The characteristic estimation means EC2 estimates the degree of elution of the PT catalyst based on the relationship between the oxidation-reduction reaction rate of the Pt catalyst and the output voltage and temperature of the fuel cell FC acquired by the operation state acquisition means EC1, and the control means EC4 performs a degradation suppression operation of the PT catalyst based on the estimated degree of elution of the PT catalyst. Specifically, under the same conditions, the current-voltage hysteresis H is calculated, and if there is a difference in the calculated current-voltage hysteresis, it is determined that the effective surface area of the Pt catalyst has decreased or degraded and is estimated as the degree of elution of the Pt catalyst. A degradation suppression operation of the Pt catalyst in this case may be considered to be an operation that suppresses the degradation of the Pt catalyst by decreasing the upper limit value of the output voltage in a control for absorbing the excess and shortage of power distribution in a capacitor component of the fuel cell.

Figure 4:
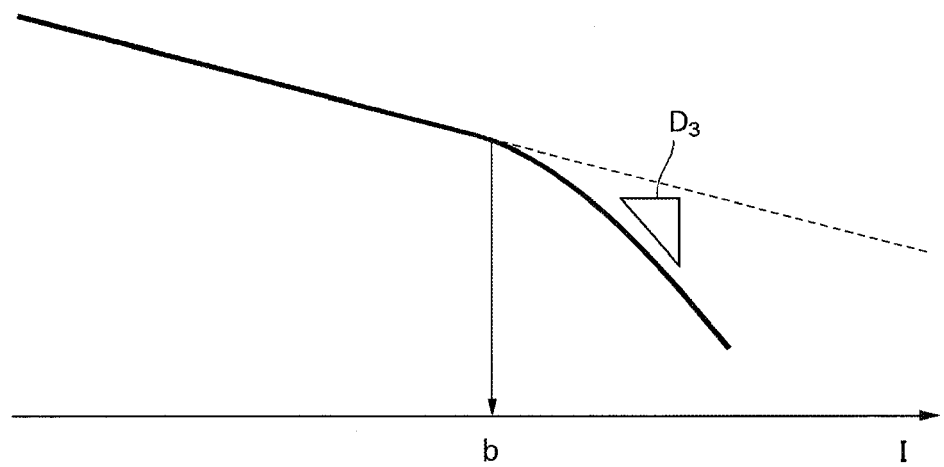
FIG. 4 is diagram showing an enlarged concentration overvoltage part in FIG. 1.

Next, a current-voltage estimation (IV estimation) by the concentration overvoltage $\eta_{conc}$ and a change in control will be described. The operation state acquisition means EC1 acquires the temperature, stoichiometry ratio and amount of residual water of the fuel cell FC, and the characteristic estimation means EC2 determines the concentration overvoltage $\eta_{conc}$ based on the acquired temperature, stoichiometry ratio and amount of residual water of the fuel cell C and estimates the IV characteristic based on the determined concentration overvoltage $\eta_{conc}$. More specifically, the inclination $\Delta 3$ of the IV characteristic and the drooping position $\beta$ of the IV characteristic by the concentration overvoltage $\eta_{conc}$ shown in FIG. 4 are estimated with map values of the temperature, stoichiometry ratio and amount of residual water. The operation state acquisition means EC1 integrates the output current of the fuel cell FC and estimates the amount of residual water based on the map with the amount of residual water. The characteristic estimation means EC2 determines the $\Delta 3$ which is the falling amount of the concentration overvoltage $\eta_{conc}$ based on the acquired amount of residual water and the map with the concentration overvoltage $\eta_{conc}$. The drooping position $\beta$ of the IV characteristic is determined based on the map with the temperature, the stoichiometry ratio and the amount of residual water.

The degradation detection means EC3 estimates the degree of carbon oxidation of the Pt catalyst used in the fuel cell FC, and the control means EC4 performs a warning control based on the estimated degree of carbon oxidation of the Pt catalyst. More specifically, the degree of carbon oxidation of the Pt catalyst is estimated from the increase in the inclination $\Delta 3$ of the IV characteristic and the degree of decrease in the drooping position $\beta$ of the IV characteristic. In this case, as a control for decreasing the concentration overvoltage $\eta_{conc}$, it is preferable to perform a flooding prevention control such as an increase in stoichiometry or a decrease in backpressure. When there is an excessive increase in the inclination $\Delta 3$ of the IV characteristic or an excessive decrease in the drooping position $\beta$ of the IV characteristic, it is preferable to warn the user so as to prompt a stack exchange of the fuel cell FC.

DESCRIPTION OF REFERENCE NUMERALS

FCS ... Fuel cell system; FC ... Fuel cell; ASS ... Oxidant gas supply system; AS1 ... Filter; AS2 ... Air compressor; AS3 ... Oxidant gas flow path; AS4 ... Oxidant off-gas flow path; AS5 ... Humidifier; A3 ... Backpressure regulating valve; CS ... Cooling system; CS1 ... Radiator; CS2 ... Coolant pump; CS3 ... Coolant forward path; CS4 ... Coolant return path; FSS ... Fuel gas supply system; FS1 ... Fuel gas supply source; FS2 ... Injector; FS3 ... Fuel gas flow path; FS4 ... Circulation flow path; FS5 ... Circulation pump; FS6 ... Exhaust/drain flow path; H1 ... Cutoff valve; H2 ... Regulator; H3 ... Cutoff valve; H4 ... Cutoff valve; H5 ... Exhaust/drain valve; ES ... Electrical power system; ES1 ... DC/DC converter; ES2 ... Battery; ES3 ... Traction inverter; ES4 ... Traction motor; ES5 ... Auxiliary device; EC ... Controller; S1 ... Voltage sensor; S2 ... Current sensor; S3 ... SOC sensor; S4, S6: Pressure sensor; S5 ... Water temperature sensor; ACC ... Accelerator open degree signal; IG ... Ignition signal; VC ... Vehicle speed signal.

What is claimed is:

1. A fuel cell system that supplies a fuel gas including hydrogen and an oxidant gas to a fuel cell to generate electrical power, the fuel cell system comprising:
   an operation state acquisition unit programmed to acquire a relationship between an oxidation-reduction reaction rate of a Pt catalyst used in the fuel cell and an output voltage and temperature of the fuel cell from a map due to prior evaluation; and a characteristic estimation unit programmed to estimate an IV characteristic that indicates a relationship between a current and a voltage in the fuel cell, wherein the characteristic estimation unit is programmed to determine a current-voltage hysteresis as being the current-voltage hysteresis that follows an effective surface area of the Pt catalyst that was determined from the relationship between the oxidation-reduction reaction rate of the Pt catalyst and the output voltage and temperature of the fuel cell acquired by the operation state acquisition unit, and estimates the IV characteristic by reducing the determined current-voltage hysteresis as an amount of fall due to an oxidation of the Pt catalyst of the IV characteristic.

2. The fuel cell system according to claim 1, wherein the operation state acquisition means is programmed to measure an impedance at a stable state of the fuel cell, and wherein the characteristic estimation unit is programmed to estimate a degree of elution of the Pt catalyst that indicates a degree of decrease in the effective surface area of the Pt catalyst based on the relationship between the oxidation-reduction reaction rate of the Pt catalyst and the output voltage and temperature of the fuel cell acquired by the operation state acquisition unit, and wherein a control unit is programmed to perform a degradation suppression operation of the Pt catalyst based on the estimated degree of elution of the Pt catalyst.

* * * * *